United States Patent [19]

Bugga et al.

[11] Patent Number: 5,656,388
[45] Date of Patent: Aug. 12, 1997

[54] METAL HYDRIDES AS ELECTRODE/CATALYST MATERIALS FOR OXYGEN EVOLUTION/REDUCTION IN ELECTROCHEMICAL DEVICES

[75] Inventors: Ratnakumar V. Bugga, Arcadia; Gerald Halpert, Pasadena; Brent Fultz, Pasadena; Charles K. Witham, Pasadena; Robert C. Bowman, La Mesa; Adrian Hightower, Whittier, all of Calif.

[73] Assignee: California Institute of Technology, Pasadena, Calif.

[21] Appl. No.: 472,872

[22] Filed: Jun. 7, 1995

[51] Int. Cl.$^6$ ................................................. H01M 4/02
[52] U.S. Cl. .................. 429/40; 429/27; 429/59; 429/101; 429/218; 420/900
[58] Field of Search ................... 429/59, 101, 218, 429/27, 40; 420/900

[56] References Cited

U.S. PATENT DOCUMENTS

| | | |
|---|---|---|
| 4,121,924 | 10/1978 | deBarbadillo, II . |
| 4,142,300 | 3/1979 | Gruen et al. . |
| 4,147,536 | 4/1979 | Osumi et al. . |
| 4,378,331 | 3/1983 | Bruning et al. . |
| 4,409,180 | 10/1983 | Sandrock et al. . |
| 4,487,817 | 12/1984 | Willems et al. .................. 429/27 |
| 4,605,603 | 8/1986 | Kanda et al. ..................... 429/59 |
| 5,085,944 | 2/1992 | Ebato et al. . |
| 5,185,221 | 2/1993 | Rampel ............................ 429/59 |
| 5,306,583 | 4/1994 | Bouet et al. . |
| 5,434,022 | 7/1995 | Anani et al. ..................... 429/218 |
| 5,455,125 | 10/1995 | Matsumoto et al. ............. 429/59 |

OTHER PUBLICATIONS

Anaba A. Anani, et al.; Mechanically–Alloyed Hydrogen Storage Materials with High Gas Phase and Electrochemical Storage Capacities; Spring Meeting, Honolulu, Hawaii, May 16–21, 1993; The Electrochemical Society, Inc., Extended Abstracts, vol. 93–1, pp. 82–83, Abstract No. 55.

Konstantin Petrov, et al.; Optimization of Composition and Structure of Metal–Hydride Electrodes; Spring Meeting; Honolulu, Hawaii; May 16–21, 1993; The Electrochemical Society, Extended Abstracts, vol. 93–1, pp. 41–42, Abstract No. 27.

A. Anani, et al.; Characterization of an Sn–Modified $AB_5$–Type Alloy for Hydrogen Storage and Battery Applications; Fall Meeting, Toronto, Canada; Oct. 11–16, 1992; The Electrochemical Society, Inc., Extended Abstracts, vol. 92–2, p. 99, Abstract No. 64.

Konstantin Petrov, et al.; Sn–Modified $AB_5$ Type Alloys Prepared by Mechanical Alloying and Arc–melting Methods, for Hydride Electrodes; Fall Meeting, New Orleans, Louisiana, Oct. 10–15, 1993; The Electrochemical Society, Inc., vol. 93–2, Extended Abstracts, pp. 78–79, Abstract No. 46.

T. Sakai, et al.; Nickel–Metal Hydride Batteries Using Rare–Earth Based Hydrogen Storage Alloys; Proceedings of the Symposium on Hydrogen Storage Materials, Batteries, and Electrochemistry; The Electrochemical Society, Proceedings vol. 92–5, pp. 59–91, 1992. Month N/A.

J. McBreen, et al.; In Situ XAS Studies of Metal Hydride Electrodes; Spring Meeting, San Francisco, California, May 22–27, 1994, The Electrochemical Society, Inc., Extended Abstracts, vol. 94–1, p. 1198, Abstract No. 773.

(List continued on next page.)

*Primary Examiner*—M. Nuzzolillo
*Attorney, Agent, or Firm*—Limbach & Limbach, L.L.P.

[57] ABSTRACT

An at least ternary metal alloy of the formula, $AB_{(5-y)}X_{(y)}$, is claimed. In this formula, A is selected from the rare earth elements, B is selected from the elements of groups 8, 9, and 10 of the periodic table of the elements, and X includes at least one of the following: antimony, arsenic, and bismuth. Ternary or higher-order substitutions, to the base $AB_5$ alloys, that form strong kinetic interactions with the predominant metals in the base metal hydride are used to form metal alloys with high structural integrity after multiple cycles of hydrogen sorption.

29 Claims, 11 Drawing Sheets

OTHER PUBLICATIONS

M.P Sridhar Kumar, et al.; Effect of Ce, Co and Sn Substitution on Gas-Phase and Electrochemical Hydriding/Dehydriding Properties of LaNi5; Spring Meeting, San Francisco, California, May 22–27, 1994, The Electrochemical Society, Inc., Extended Abstracts, vol. 94–1, pp. 1225–1226, Abstract No. 790.

A. Anani, et al.; Hydrogen Storage in Modified $AB_5$–type Alloys for Battery and Fuel Cell Applications; Fall Meeting, Toronto, Ontario, Canada, Oct. 11–16, 1992, The Electrochemical Society, Inc., Extended Abstracts, vol. 92–2, pp. 720, Abstract No. 489.

C.K. Witham, et al.; Microstructural Effects of Hydrogen Charging and Discharging on $LaNi_{5-x}Sn_x$; Fall Meeting, Miami Beach, Florida, Oct. 9–14, 1994, The Electrochemical Society, Inc., Extended Abstracts, vol. 94–2, pp. 58–59, Abstract No. 38.

Konstantin Petrov, et al.; Optimization of Structure and Composition of Metal–Hydride Electrodes, Using Sn–Modified $AB_5$ Type Alloy; Fall Meeting, New Orleans, Louisiana, Oct. 10–15, 1993; The Electrochemical Society, Extended Abstracts, vol. 93–2, pp. 80–81, Abstract No. 47.

B.V. Ratnakumar, et al.; Studies on $AB_5$ Metal Hydride Alloys with Sn Additives; Fall Meeting, Miami Beach, Florida, Oct. 9–14, 1994, The Electrochemical Society, Extended Abstracts, vol. 94–2, pp. 56–57, Abstract No. 37.

A.R. Miedema; The Heat of Formation of Alloys, Philips Technical Review, vol. 36, 1976, No. 8; pp. 217–231. (month N/A).

A.R. Miedema, et al.; Model Predictions for the Enthalpy of Formation of Transition Metal Alloys; CALPHAD, vol. 1, No. 4, pp. 341–359, Pergamon Press, 1977; Printed in Great Britain. month N/A.

M.H. Mendelsohn, et al.; The Effect on Hydrogen Decomposition Pressures of Group IIIA and IVA Element Substitutions for Ni in $LaNi_5$ Alloys, Materials Research Bulletin, vol. 13, pp. 1221–1224, Sep. 25, 1978. Pergamon Press, Inc.; Printed in the United States.

M. Mendelsohn, et al.; Group 3A and 4A Substituted $AB_5$ Hydrides; Inorganic Chemistry, vol. 18, No. 12, pp. 3343–3345; Mar. 5, 1979.

A.R. Miedema, et al.; Cohesion in Alloys–Fundamentals of a Semi–Empirical Model; Physica 100B (1980) pp. 1–28; North–Holland Publishing Company; Dec. 7, 1979.

A.K. Niessen, et al.; Model Predictions for the Enthalpy of Formation of Transition Metal Alloys II; CALPHAD, vol. 7, No. 1, pp. 51–70; 1983. (month N/A).

F. W. Oliver, et al.; Mossbauer Studies on $LaNi_{4.7}Sn_{0.3}$ and its Hydride; J. Appl. Phys., 57(1); Apr. 15, 1985.

J.J.G. Willems, et al.; From Permanent Magnets to Rechargeable Hydride Electrodes; Journal of the Less–Common Metals, 129 (1987) pp. 13–30. (month N/A).

Tetsuo Sakai, et al.; The Influence of Small Amounts of Added Elements on Various Anode Performance Characteristics for $LaNi_{2.5}Co_{2.5}$–Based Alloys; Journal of the Less--Common Metals, 159 (1990) pp. 127–139. (month N/A).

Tetsuo Sakai, et al.; Some Factors Affecting the Cycle Lives of $LaNi_5$–Based Alloy Electrodes of Hydrogen Batteries; Journal of the Less–Common Metals, 161(1990) pp. 193–202. (month N/A).

M. Tadokoro, et al.; Development of Hydrogen Absorbing Alloys for Nickel Metal Hydride Secondary Batteries; The Electrochemical Society, Proceedings of the Symposium on Hydrogen Storage Materials, Batteries, and Electrochemistry, vol. 92–5; pp. 92–104, 1992.

B. V. Ratnakumar, et al.; Studies on $AB_5$ Metal Hydride Alloys with Sn Additives; Proceedings of The Symposium on Hydrogen and Metal Hydride Batteries; Fall Meeting, Miami Beach Florida, Oct. 9–14, 1994, The Electrochemical Society, Inc., Battery Division, Proceedings vol. 94–27, pp. 57–67.

C.K. Witham, et al., Microstructural Effects of Hydrogen Charging and Discharging on $LaNi_{4.8}Sn_{0.2}$, Proceedings of the Symposium on Hydrogen and Metal Hydride Batteries; Fall Meeting, Miami Beach, Florida, Oct. 9–14, 1994, The Electrochemical Society, Inc.; Battery Division, Proceedings vol. 94–27, pp. 68–77.

R. Balasubramaniam, et al.; Solution Thermodynamics of Hydrogen in the Mischmetal–$Ni_5$System with Aluminum Manganese and Tin Substitutions; Journal of Alloys and Compounds, 185 (1992) pp. 259–271. (month N/A).

R. Balasubramaniam, et al.; Hydriding Properties of $MmNi_5$ System with Aluminum, Manganese and Tin Substitutions; Journal of Alloys and Compounds, 196 (1993); pp. 63–70. (month N/A).

Dhanesh Chandra, et al.; Cyclic Stability of Rare Earth Pentanickel Hydrides; Rare Earths, Extraction, Preparation and Applications; The Minerals, Metals & Materials Society, 1988 (month N/A).

I. Matsumoto and A. Ohta Matshushita; Metal Hydride Batteries and MpH Alloys; presented at the IBA Conference, Seattle, Washington; Oct. 1990. (month N/A).

Konstantin Petrov, et al.; Optimization of Composition and Structure of Metal–Hydride Electrodes; Journal of the Electrochemical Society, vol. 141, No. 7, pp. 1747–1750; Jul., 1994.

METAL HYDRIDES AS ELECTRODE/ CATALYST MATERIALS FOR OXYGEN EVOLUTION/REDUCTION IN ELECTROCHEMICAL DEVICES

This invention was made in the course of work done under a NASA contract and is subject to the provisions of Public Law 96-517 (35 U.S.C. §202) in which the contractor has elected to retain title.

BACKGROUND OF THE INVENTION

The present invention is directed to intermetallic alloys for use as negative electrodes in hydrogen storage devices. Various intermetallic alloys have been widely used as negative electrodes in hydrogen storage devices for batteries. The nickel-metal hydride (Ni-MH) alkaline rechargeable battery, in which the positive electrode (cathode) is composed of nickel oxyhydroxide (NiOOH) and the anode is composed of a hydrided metal alloy, is the principle type of battery in which intermetallic hydrides are used.

The nickel-metal hydride battery satisfies the imminent need for environmentally-compatible rechargeable batteries superior to conventional nickel-cadmium (Ni-Cd) batteries in both versatility and performance. Nickel-metal hydride (Ni-MH) batteries have been developed by companies in the U.S. (Duracell) and Germany (Varta), and are in production by several companies in Japan (Sanyo, Matsushita Battery, Japan Storage Battery, Toshiba), Hong Kong (Gold Peak), and the U.S. (Eveready/Gates, Ovonic Battery, and Ovonic's licensee, Harding Energy Systems).

The Ni-MH electrochemical system utilizes a metal hydride (MH) anode in place of cadmium (Cd). Ni-MH batteries have operating characteristics similar to Ni-Cd. Both systems exhibit high rate discharge capabilities, fast charging, and similar voltage compatibilities. Likewise, both systems utilize similar charge cutoff methods and gas recombination mechanisms. The advantages of Ni-MH cells over Ni-Cd cells include: (1) higher specific energy (by a factor of 1.5–2.0 times), (2) higher energy density (160–200 Wh/l as compared to 70–120 Wh/l for Ni-Cd), (3) improved environmental compatibility, and (4) the promise of longer cycle life owing to the absence of life-limiting cadmium migration. The charge/discharge cycle lifetime of Ni-MH batteries has been limited by degradation of the metal alloy-based electrode.

An intermetallic alloy is considered suitable for use in an alkaline rechargeable battery if it satisfies two related physical criteria. First, the alloy should be able to absorb a large amount of hydrogen. Second, the alloy should also maintain a high degree of structural integrity and good hydrogen absorption characteristics over multiple charge/discharge cycles (e.g., hydrogen absorption/desorption). The first characteristic will be referred to as "capacity" or "hydrogen capacity," and the second characteristic will be referred to as "structural integrity" or "high cycle lifetime." The problem confronting designers of alkaline rechargeable batteries, therefore, is one of improving the structural integrity of the metal hydride alloy without sacrificing capacity.

The intermetallic alloys used in the anodes of alkaline rechargeable batteries include two generic classes: $AB_2$ and $AB_5$. In the $AB_2$ category-alloys which adopt a Laves phase crystalline structure-several alloys have been used as hydrogen storage materials. A typical $AB_2$ alloy may contain vanadium (V), titanium (Ti), nickel (Ni), zirconium (Zr), chromium (Cr) (e.g. $V_{22}Ti_{16}Zr_{16}Ni_{39}Cr_7$). These different elements are assigned functional roles in hydrogen absorption/desorption (charge/discharge) cycling such as hydrogen storage (V, Ti, Zr), enabling the formation of a protective oxide (Ti and Zr) and embrittling the alloy hydride to produce high surface areas (Zr). As expected with the above-mentioned metal hydride alloy, the microstructure contains several (at least four) phases. The rationale that was used in designing these alloys was that short, medium, and long-range disorder in crystal structure and composition were beneficial to the cycle lifetime, and that these disorders allowed for good hydrogen-metal bond strengths, hydrogen storage capacity, and catalytic activity. In the $AB_5$ category—alloys which adopt a Haucke phase crystalline structure—most anode materials for Ni-MH batteries have been based upon $LaNi_5$. This binary alloy offers relatively high capacity for hydrogen absorption (up to 400 mAh/g), relatively high rates of absorption, mild activation treatments, and low equilibrium pressures. The usefulness of $LaNi_5$ as a metal hydride anode is limited since it suffers a rapid decline in capacity during charge/discharge cycling. This structural and functional degeneration of the alloy has been attributed to the formation of a thick layer of $La(OH)_3$, a process that is dependent on an intergranular diffusion of La to the surface of the electrode. The significant volume dilatation of the alloy upon hydriding (24%) causes pulverization, and is believed to promote the diffusion of elemental lanthanum.

Alloy modifications to $LaNi_5$ have been made by substituting other elements for lanthanum, nickel, or both, and by changing the overall stoichiometry of the alloy. In studies of gas-phase hydrogen absorption/desorption cycling, it has been found that $LaNi_{4.6}Sn_{0.4}$ had a plateau pressure of 0.076 atm, very low hysteresis, and an absorption capacity corresponding to 0.97 H/M. Later, it was found that $LaNi_{4.8}Sn_{0.2}$ exhibited a capacity loss of only 15% after 10,000 thermal cycles.

The improvement in the charge/discharge cycle lifetime has been attributed to a reduction in volume dilatation of the metal hydride alloy. Small additions of Al or Si were also reported to promote structural integrity and cycle longevity by forming a protective film at the electrode surface. A lifetime of over 4000 cycles was achieved with an alloy of the following composition: $[La_{0.8}Nd_{0.2}][Ni_{2.5}Co_{2.4}Si_{0.1}]$, in a 300 mAh sealed cell. In studies of Mn, Cr, Al, Co, and Cu ternary substitutions for nickel in $LaNi_5$, it was found that each ternary substitution lowered the equilibrium pressure required for gas-phase hydrogen absorption. These observations were attributed to an increased unit cell volume in the ternary alloy hydrides. It has also been found that Ti and Zr solutes were beneficial to cycle lifetime since a protective oxide forms on the anode surface.

While structural integrity has improved as a result of these substitutions, the beneficial lifetime effect was uniformly accompanied by a reduction in the hydrogen capacity of the metal alloy. It has also been found that substitution of other rare earth elements, such as (cerium) (Ce) and neodymium (Nd), for La improves the lifetime of Ni-MH batteries under charge/discharge cycling. These results were especially auspicious for misch metal (Mm) substitutions for La in the $LaNi_5$-based ternary or higher-order alloys. Naturally-occurring Mm is comprised of a mixture of the early elements in the rare earth series. With Chinese Mm estimated to cost only about $5/kg, Mm substitutions for La would improve considerably the economics of $AB_5$ battery electrodes and may be a desirable substitute to ensure commercial viability in the consumer marketplace.

It is unclear, however, what—if any—rationale has been used by the designers of the above-mentioned $AB_5$-based alloys. As noted above, various alloy modifications to LaNi$_5$ have been made yet no guiding principle for the design of stable LaNi$_5$-based or MmNi$_5$-based ternary or higher order metal alloys has been devised. Currently, it is accepted that the structural integrity of AB$_5$ and higher order AB$_5$-based alloys is determined primarily by the change in atomic volume during hydrogen absorption and that the deterioration of battery cells is controlled by the thermodynamic tendency to form oxides of the rare earth metal on the surface of the anode. In the analysis of AB$_2$ and AB$_2$-based alloys, several competing theories regarding the structural integrity of metal alloys upon multiple cycles of hydrogen sorption have been advanced. Many of these substitution strategies appear to be based on a random sampling of candidate elements. None of these theories or explanations for improved structural integrity of these metal alloys can be applied uniformly to the variety of alloy compositions used in the anode of alkaline rechargeable cells. Furthermore, none accurately predicts the behavior of a class of metal hydride alloys upon hydriding and, therefore, none can be used to choose suitable candidate elements for substitution into a binary or higher order metal alloy.

It is clear, however, that ternary solute additions such as Sn can improve the cycle lifetimes of LaNi$_5$-based alloys during hydrogen absorption/desorption cycling but it is not clear why this is so. Furthermore, efforts to improve the structural integrity of metal alloys has resulted in a corresponding, and often overwhelming, loss of hydrogen capacity.

Thus, an object of the present invention is to identify ternary or higher-order alloys aimed at improving the structural integrity of the metal alloy over multiple charge/discharge cycles in a liquid medium, such as is the case for a rechargeable battery, while retaining high hydrogen capacity.

The present invention is also directed to electrode/catalyst materials for oxygen evolution/reduction reactions in batteries, fuel cells and electrolysers. The oxygen reduction reaction is utilized as the cathodic reaction in various electrochemical cells such as metal-air cells and fuel cells. The typical reactions for oxygen reduction are:

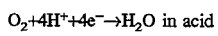

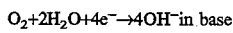

The reduction of oxygen is routinely catalyzed by a variety of materials depending on the electrolyte and system temperature. Noble metals, and in particular platinum, have been traditionally used as the oxygen reduction catalyst in such systems. Platinum is normally dispersed on a high-surface area carbon support material to provide maximum capacity per unit mass of electrocatalyst.

A problem with using platinum as the oxygen reducing catalyst is that it is rather expensive. Thus, an object of the present invention is to identify relatively less expensive materials for use as an oxygen reducing catalyst in electrochemical devices and, in particular, fuel cells.

SUMMARY OF THE INVENTION

The present invention is directed to metal hydride alloys which exhibit good structural integrity and hydrogen capacity. In a preferred embodiment, the elements chosen to comprise the metal alloy should be selected to suppress phase transformations in $AB_{(5-y)}X_{(y)}$ by substituting for B those ternary elements that bond strongly with A, and perhaps also with B. To do so, we use ternary or higher order solutes so that the binary alloys AX will have large heats of formation and, as a secondary consideration, so that the binary alloys BX will have large heats of formations. Antimony, arsenic, and bismuth as ternary substitutes X will yield LaNi$_5$ based ternary alloys with cycle lifetimes superior to that of $LaNi_{(5-y)}Sn_{(y)}$ since the enthalpies of formation of LaSb, LaAs, and LaBi are, respectively, −36, −36 and, −32 kcal/mole, while the enthalpy of formation of LaSn is −28 kcal/mole.

It should be emphasized that the alloy design strategy of the present invention may be used to design quaternary and higher-order metal alloys which will form stable metal hydride alloys. For example, the substitution of the combination of tin and antimony for Ni in LaNi$_5$ should have an effect comparable to the average of the effects seen for tin substitution and antimony substitution for Ni.

Although the present invention emphasizes the design of AB$_5$-based alloys, the present alloy design philosophy is equally applicable to the design of the AB$_2$-based alloys. It should be noted that while much of the prior art is directed to the design of metal hydride alloys for use in the anode of alkaline rechargeable batteries, the present invention also finds application in gas-phase hydrogen storage and hydrogen transport devices, as well as other applications in which metal alloys with high structural integrity would be desirable.

The present invention is also directed to alloys used for the electrocatalysis of the oxygen reduction reaction in electrochemical devices such as fuel cells and metal-air cells. It has been found that the AB$_5$-based and AB$_2$-based alloys described above are not only useful in hydrogen storage devices but also may be used as electrocatalyzers for the oxygen reduction reaction. Thus, the AB$_5$-based and AB$_2$-based alloys described herein provide a low cost alternative to the conventional noble metal catalysts. A particularly useful application of the present invention is as a bipolar electrode for bipolar metal hydride air cells or hydrogen-oxygen fuel cells.

DETAILED DESCRIPTION OF THE INVENTION

The invention relates to metal hydride alloys and, more specifically, the present invention is directed to an at least ternary metal hydride alloy which exhibits high stability over multiple cycles of hydrogen sorption. The alloy design strategy of the present invention is based on suppressing the kinetics of phase transformations such as disproportionation and subsequent oxidation. Specifically, the design approach suppresses the mobility of the metal hydride alloy elements—especially of the heavier rare-earth atoms, by locking them into the local structure of the Haucke phase.

The basic design philosophy is based upon our observation that a correlation exists between improved cycle lifetimes and the heat of formation of a proposed AX alloy. The data on alloy heat of formation were obtained from the semi-empirical method of A. R. Miedema, which was successful in predicting the empirical heats of formation of several equilibrium compounds of $LaNi_4X$. The semi-empirical method of Miedema is described in *Model Predictions for the Enthalpy of Formation of Transition Metal Alloys II*, Calphad, Vol 7, No. 1, pp. 51–70, 1993; *Cohesion in Alloys—Fundamentals of a Semi-Empirical Model*, A. R. Miedema, Physica 100B (1980) 1–28; *The Heat of Formation of Alloys*, A. R. Miedema, Philips Technical Review, Vol. 36, 1976, No. 8; and *Model Predictions for the Enthalpy of Formation of Transition Metal Alloys*, Calphad, Vol. 1, No. 4, pp. 341–359; each of which are herein incorporated by reference.

Figure 1:
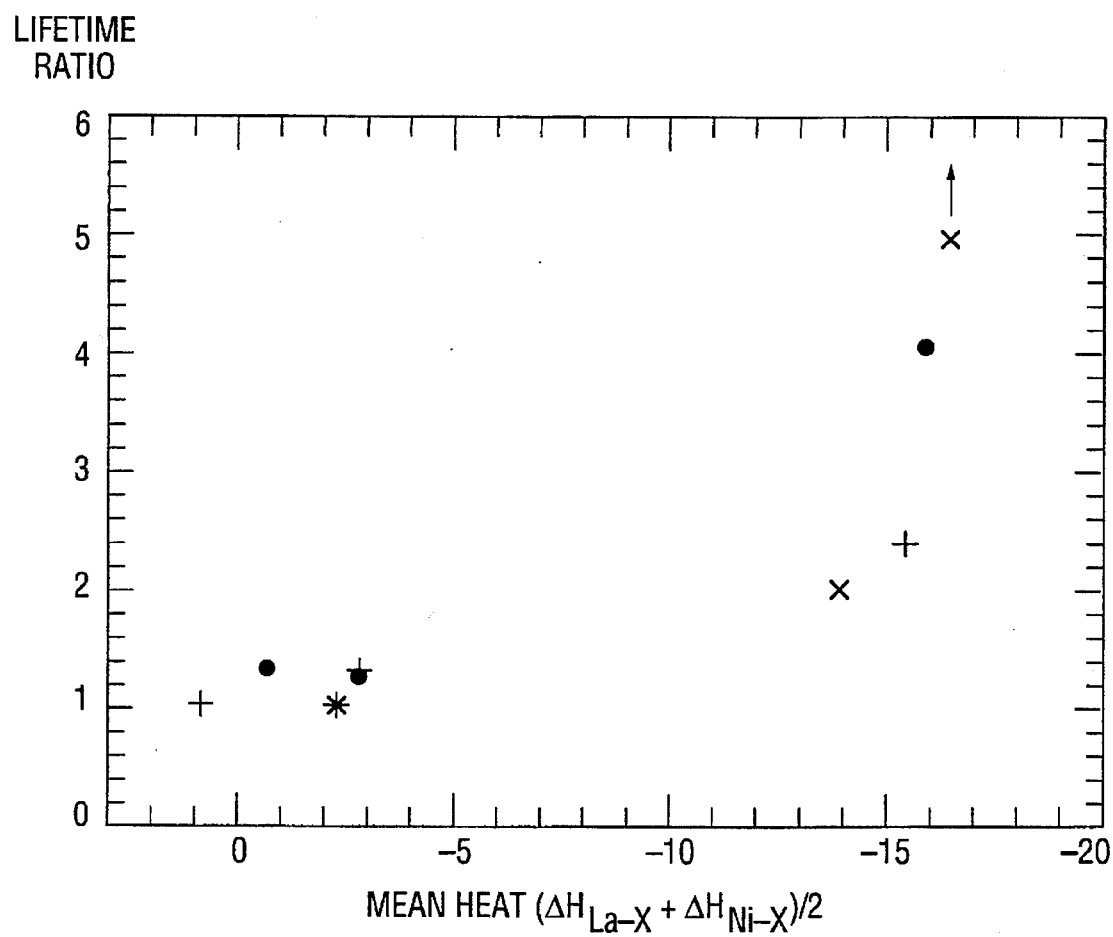
FIG. 1 shows the improvement in cycle lifetime of LaNi$_{5-\delta}$X$_\delta$ with respect to binary LaNi$_5$ for several ternary substitutes X as a function of the average of Miedema's heat of formation of LaX and NiX alloys.

X-ray diffraction measurements, used to determine the precise structure of Haucke phase metal alloys, have showed that the Sn atoms in $LaNi_{4.8}Sn_{0.2}$ reside in 3 g sites on the Ni-plane of the Haucke phase crystals. In such a structure, the Sn atoms have four La "neighbors." Other ternary substitutes such as antimony (Sb), arsenic (As), and bismuth (Bi) will likely occupy the same crystallographic sites as tin. Referring to FIG. 1, a plot of the lifetime ratio as a function of the average of the heat of formation of a LaX compound and the heat of formation of a NiX compound is shown. Data for binary alloy LaX is at the star at (-2,1.0). The degree of correlation between these parameters is striking.

The crystallographic information, together with the correlation between cycle lifetime and the average heats of formation of the binary components of the ternary alloy seen in FIG. 1, suggests that controlling the chemical bond strength between the ternary substitute atom and the lanthanum atom is a way to manipulate the cycle lifetime and, thus, the structural integrity of the $AB_5$-based alloys. Noting that hydrides of $LaNi_5$ are thermodynamically unstable against a disproportionation reaction, the lanthanum atoms and nickel atoms segregate into small but distinct regions. We concluded that it was improbable that the large thermodynamic driving force for disproportionation dominated over the related kinetic driving force. As an alternative, we considered evidence suggesting that such a disproportionation reaction is controlled strongly by diffusion kinetics. This evidence was found in studies of hydrogen absorption/desorption cycling of $LaNi_5$.

Furthermore, the kinetics of metal atom movements can be used to control the cycle lifetimes of $AB_{(5-Y)}X_{(Y)}$ alloys and the ternary substitutes for B alter the kinetics. It is known that metal atom diffusivities in strongly ordered compounds are especially low. The activation energies for diffusion are large, and become larger still as the state of order becomes more perfect. This is now accepted as being due in part to the strong chemical bonds that must be broken as atomic movement occurs. In ordered alloys and intermetallic compounds, for example, activation energies for diffusional processes have been shown to increase with the critical temperature of the ordered phase, which reflects the average strength of chemical bonding in the alloy.

Based on the crystallography of the Haucke phase and the large difference in the size of lanthanum and nickel atoms, it is almost certain that the lanthanum atoms are the slow-moving species in phase transformations such as the disproportionation reaction. We expect that the lanthanum atoms must undergo some movement to form fcc $LaH_2$. Diffusive jumps of the nickel atoms should also be restricted, especially if the ternary solutes also have strong bonding to nickel atoms. If the ternary solutes sit on Ni sites with many La neighbors, the most promising ternary solutes for suppressing diffusivity should be those with the strongest chemical bonds to lanthanum atoms. Our alloy design strategy is based on suppressing the kinetics of phase transformations, such as disproportionation, and subsequent oxidation. In this manner, the mobility of the lanthanum atoms is reduced thereby locking them into the local structure of the Haucke phase.

Our alloy design strategy is at odds with current thinking that the stability of $LaNi_5$ is determined primarily by its change in atomic volume during hydrogen absorption and that the deterioration in battery cells is controlled by the thermodynamic tendency to form $La(OH)_3$ on the electrode surface. We demonstrate, however, that both of these problems are closely related to atom movements, especially of the La atoms in the $LaNi_5$-based alloys. Diffusion in the crystal is first necessary before La atoms can move to grain boundaries and then migrate to the electrode surface. Suppressing diffusion should suppress the corrosion problem at its source. It is well-known that diffusion is influenced strongly by the defect density in crystalline materials. The volume dilatation upon hydriding will certainly increase the defect concentrations, as we have found in the large x-ray line broadenings and local strain contrast seen in TEM studies of $LaNi_5$ alloys that have been activated. High defect concentrations may well enhance the kinetics of diffusion, facilitating disproportionation in battery materials at low temperatures.

Applying the novel design philosophy of the present invention to the Haucke phase alloys, it becomes straight forward to select embodiments of stable metal hydride alloys with the generic formula: $AB_{(5-Y)}X_{(Y)}$. Because the A atoms are generally heavier than the B atoms, and because each ternary substitute atom X will be positioned next to four A atoms in the Haucke phase, compositions in which the binary alloys AX have high heats of formation are preferred over composition in which the binary alloys BX have high heats of formation. Still, both alternatives should yield alloys with high structural integrity.

For example, by using the semi-empirical method of Miedema, the following ternary or higher-order substitutions for Ni in $LaNi_5$ will lead to stable intermetallic alloys. Substitution of Ni with antimony (Sb) is presently a preferred embodiment. LaSb has a heat of formation of -36 kcal/mole, eight kcal/mole greater than that of LaSn. (As used herein the term "greater," when referring to heats of formation, shall mean greater in magnitude, disregarding the sign.) Furthermore, Sb is a neighbor of tin (Sn) on the Periodic Table of the Elements, and has about the same metallic radius as tin. This suggests that the volume dilatations associated with adding antimony should be about the same as for Sn. Another neighbor of Sn is indium (In) which also has about the same atomic radius as tin. Indium, however, has a lower heat of formation in a compound with lanthanum (−22 kcal/mole for In-La versus −28 kcal/mole for Sn-La). As for other ternary substitutes, the heat of formation for arsenic (As) is −36 kcal/mole for As-La. The heats of formation of Bi-La is −32 kcal/mole, and for Ge-La, the heat of formation is −25 kcal/mole. These elements should also form stable metal hydride alloys when used to partially substitute for Ni in a $LaNi_5$-based alloy hydride.

To demonstrate that the metal hydride alloys of the present invention exhibit high stability over multiple cycles of hydrogen absorption and desorption, we subjected the alloys to multiple charge/discharge cycles, measuring the absorption capacity and structural integrity at selected intervals. However, cycle lifetimes are difficult to measure and no standard method to measure cycle lifetimes exists. We have chosen one of a variety of different test conditions available for compiling data on cycle lifetimes. Data which relate structural integrity to alloy composition were collected from studies of both gas absorption/desorption cycling, and battery cell charge/discharge cycling. The invention will be better understood by way of the following examples:

EXAMPLE 1

The manufacture of the metal hydride alloy ingots was carried out in the following manner. $LaNi_{(5-y)}Sn_y$ alloys were prepared by melting high purity (99.99%) materials in an induction-melt furnace under an argon overpressure of about 3 psi. The ingots were then sealed in quartz ampoules that had been vacuum purged and backfilled with argon, and were annealed at 950° C. for periods of between 72 and 90 hours.

EXAMPLE 2

Three $LaNi_{5-y}Sn_y$ alloys with Y=0.0, 0.1, and 0.2 were obtained and ingots of these alloys were prepared by arc-melting appropriate amounts of high purity (e.g., >99.95 atomic percent) metals. Optical metallography and x-ray diffractometry showed that all three $LaNi_{5-y}Sn_y$ alloys were single phase after the ingots had been vacuum annealed for several days at 1170 K (Y=0.1) or 1220 K (Y=0.0 and 0.2). Pieces of the ingots were ground into 100 mesh powder for loading into an electropolished 316L stainless steel reaction vessel. The initial activation of the powder consisted of several evacuation and hydrogen absorption cycles using a high vacuum compatible gas-handling system based upon a turbomolecular vacuum pump station and with MKS Instruments model 315 Baratron high precision capacitance manometers. After activation, the reactor was opened in a glove box with an argon atmosphere containing oxygen and water levels below 1.0 ppm and 0.1 ppm, respectively.

Portions of the activated $LaNi_{5-Y}Sn_Y$ powder were retained for characterization by x-ray diffraction, surface area measurements by the BET method, and scanning and transmission electron microscopy examinations. Nominal 5 gram samples of the activated alloy powder were accurately reweighed, and returned to the reactor vessel for isotherm measurements and thermal cycling.

A gas manifold and calibrated volumes were assembled with electropolished 316L stainless steel and VCR Fittings. A Tribodyn oil-free vacuum pump with a base pressure below $10^{-4}$ Torr was attached to the manifold. A Setra model 212 FT pressure transducer was used to monitor the pressure to over 35 atm. Research grade (99,995% purity) hydrogen was supplied to the system through a clean stainless steel pressure regulator. For isotherm measurements between 298 K and 363 K, the reaction vessel was submerged in a thermally-regulated water bath. Thermal cycling between temperatures above 500 K to room temperature (i.e., 293–295 K) was performed with a resistively-heated copper tube furnace that enclosed the reactor vessel. Cooling was provided by a fan that blew air inside the copper sleeve and over the reactor. Type-K (i.e., chromel-alumel) thermocouples provided temperature data to an Macintosh SE computer with a Data Translation analog-to-digital converter board. Pressure data from the Setra transducer were also acquired through this board. Digital outputs from this board controlled the heater and fan. A temperature cycle consisted of 40 minutes of heating to the nominal 500 K upper temperature followed by 40 minutes of fan cooling which returned the temperature to about 295 K. The thermocouple in the center of the reactor vessel showed that about 90% of the temperature change in the heating and cooling transitions occurred within 5–10 minutes. Table I presents the hydrogen pressure over the $LaNi_{5-y}Sn_yH_x$ just before starting the thermal cycling ($P_{Low}$), the nominal high temperature limit ($T_{High}$), the pressure ($P_{High}$) at $T_{High}$, and the reversible change in hydrogen content $\Delta x$ obtained from the measured pressures in the first thermal absorption-desorption cycle.

TABLE I

Pressures, temperatures, and reversible hydrogen contents $\Delta x$ of the first and last thermal cycles for the three $LaNi_{5-y}Sn_yH_x$ samples

| Alloy Composition | Cycle Number | $P_{low}$ (atm) | $T_{low}$ (K) | $P_{High}$ (atm) | $T_{High}$ (K) | $\Delta x$ |
|---|---|---|---|---|---|---|
| $LaNi_{5.0}$ | 1 | 15.6 | 297 | 29.3 | 508 | 6.96 |
|  | 520 | 16.4 | 296 | 24.6 | 504 | 3.05 |
| $LaNi_{4.9}Sn_{0.1}$ | 1 | 12.9 | 297 | 25.5 | 502 | 6.64 |
|  | 1453 | 16.0 | 295 | 21.4 | 542 | 1.96 |
| $LaNi_{4.8}Sn_{0.2}$ | 1 | 16.9 | 294 | 30.4 | 511 | 6.29 |
|  | 1330 | 17.4 | 297 | 29.7 | 509 | 5.65 |

The x-ray diffraction measurements were performed using an Inel CSP-120 Debye-Scherrer powder diffractometer system with a sealed tube source of Co Kα radiation and an incident beam monochromater. The position-sensitive detector had a window that subtend 127° in 2θ angle with a resolution of 0.04 degrees.

The microstructures of activated and cycled $LaNi_{5-y}Sn_yH_x$ powders were studied with a Philips EM430 transmission electron microscope operating at 300 keV. This instrument included an EDAX model 9900 energy-dispersive x-ray analyzer that was used to determine the relative ratios of the metals in various regions of interest. The transmission electron microscopy (TEM) specimens were prepared by grinding the friable $LaNi_{5-y}Sn_y H_x$ powders as suspensions in the volatile and inert fluorocarbon liquid, Fluorinert FC-43 (3M Industrial Chemical Products, St. Paul, Minn.). Since the powders had been placed into this liquid while they were inside the argon atmosphere glove box, air exposure of the particles was minimized before the finely ground samples were inserted into the TEM vacuum stage.

The cycling experiment confirms that small amounts of Sn substitution (i.e., y~0.1–0.2) greatly inhibit the intrinsic disproportionation of $LaNi_{5-y}Sn_y$ during thermal cycling. The effect is quite remarkable in that $LaNi_{4.8}Sn_{0.2}H_x$ is almost immune to degradation under conditions where $LaNi_5H_x$ has suffered a 60% degradation and $LaNi_{4.9}Sn_{0.1}H_x$ has lost about 15% of its reversible capacity. Since the free energy for the disproportionation of $LaNi_5H_x$ is estimated to be about –96 KJ/mol $H_2$, it seems unreasonable that a mere 4% substitution of Sn for Ni could suppress thermodynamically such a favorable reaction. We believe that Sn atoms alter the kinetics for disproportionation by reducing the metal atom mobilities, or perhaps by retarding the nucleation kinetics of the reaction products.

Although the rate of decomposition is decreased significantly for $LaNi_{4.9}Sn_{0.1}H_x$, the same products and $LaH_x$ are formed in both alloys. The correlation between the disproportionation in our three alloys and the loss of reversible hydrogen storage capacity is strong. Although this comparison does not yield a linear dependence (since the $LaNi_{4.9}Sn_{0.1}$ alloy showed less deterioration in $\Delta x$ than would be expected from its abundance of Ni and $LaH_x$), the qualitative relationship between these parameters is reasonably good. The deterioration in $\Delta x$ correlates closely with the extent of the disproportionation reaction. The same disproportionation reaction seems to occur in the presence of Sn, but at a slower rate.

Dilute substitutions of Sn for Ni in $LaNi_5$ were shown to provide dramatic improvements in the stability of the ternary hydride phase during thermal cycling from room temperature to over 500 K. The degradation in the reversible hydrogen storage capacity $\Delta x$ was suppressed by a factor of 20 for $LaNi_{4.8}Sn_{0.2}$ in comparison to the degradation of binary $LaNi_5$. This degradation in $\Delta x$ involved an increase in the low pressure region before the distorted plateau in the P-x isotherm, consistent with the formation of the thermodynamically stable fcc $LaH_x$ phase. The high concentration limits of the plateaus were found to decrease for the degraded alloys and the residual plateaus also had increased slopes. These effects are consistent with the presence of defects and composition inhomogeneities in the cycled Haucke phase.

X-ray diffractometry and transmission electron microscopy showed that a disproportionation reaction, leading to the formation of fcc $LaH_x$ and elemental Ni, accompanied the degradation in $\Delta x$. There was reasonable consistency between the amount of these reaction products and the amount of degradation in the three alloys studied, although the reaction products may not have the same detectability in different alloys due to variations in their size. We suggest it is unlikely that such a small amount of Sn will have a strong effect on the thermodynamic stability of $LaNi_5$ against disproportionation, so the Sn atoms probably affect the kinetics of nucleation or diffusional growth of the reaction products.

EXAMPLE 3

The manufacture of an anode for an alkaline rechargeable battery made of the metal hydride alloy was accomplished in the following manner. The alloy ingots manufactured according to the method of Example 1 were crushed to 10 mesh in an argon glove box, followed by several hydrogen absorption-desorption cycles to optimize the powder's surface area. The fine alloy powder (<75 μm) was mixed with the 19% conductive diluent, i.e. INCO nickel powder (1 μm), and 5% Teflon binder. The negative electrodes (anodes) were fabricated by hot-pressing the mixture onto an expanded Ni screen. The negative electrodes for the basic electrochemical studies were fabricated by filling the BAS (Bioanalytical Systems) disk electrodes with electrode powders of equal quantities to ensure consistent values for the electrode area (0.07 cm$^2$) and porosity. The Ni-MH test cells (approximately 250 mAh) contained excess positive electrode (NiOOH), excess electrolyte (31% KOH), and a HgO/Hg reference electrode.

EXAMPLE 4

A detailed electrochemical evaluation of $LaNi_{4.8}Sn_{0.2}$, a Sn-modified $LaNi_5$, was performed in the following manner to evaluate the applicability of the alloy in the negative electrode of an alkaline rechargeable cell. Substituting a small amount of Sn for Ni provides a large improvement in the initial capacity and cyclic lifetime of the electrode, and also serves to improve the kinetics of hydrogen absorption-desorption processes.

Figure 2:
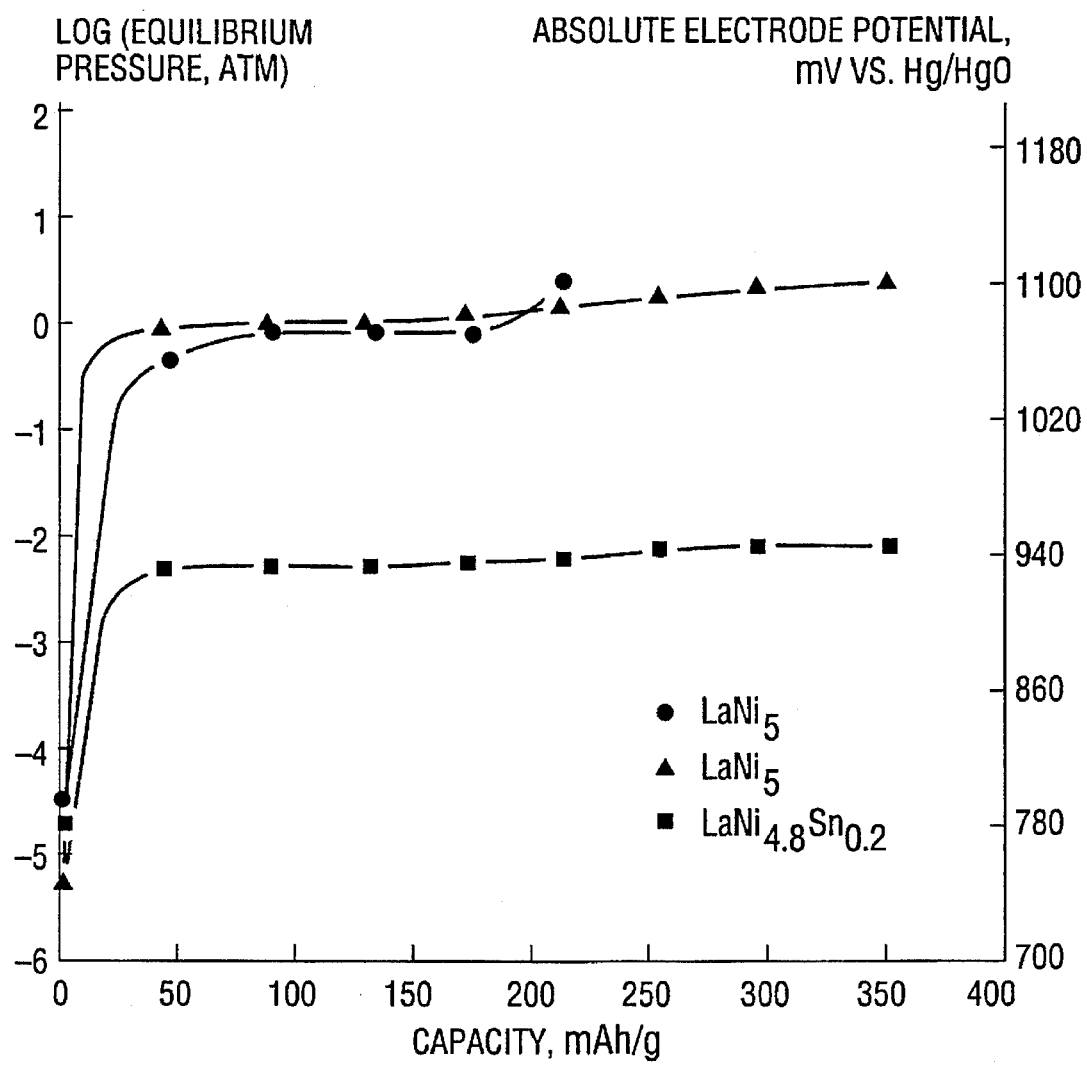
FIG. 2 shows electrochemical isotherms during charge and discharge of LaNi$_{4.8}$Sn$_{0.2}$.

FIG. 2 shows the electrochemical isotherms of $LaNi_{4.8}Sn_{0.2}$, during absorption and desorption of hydrogen. The equilibrium pressures were calculated from the equilibrium potentials using the equation:

$$E_0(\text{vs. } HgO/Hg) = -0.9324 - 0.0291 \ln(P_{H2}).$$

As may be seen from isotherms, the equilibrium pressure of $LaNi_5$ decreases upon the addition of Sn from an initial value of ~2 atm to below 1 atm. This decrease in the equilibrium plateau pressure may be related to the increase in the unit cell volume.

Figure 3:
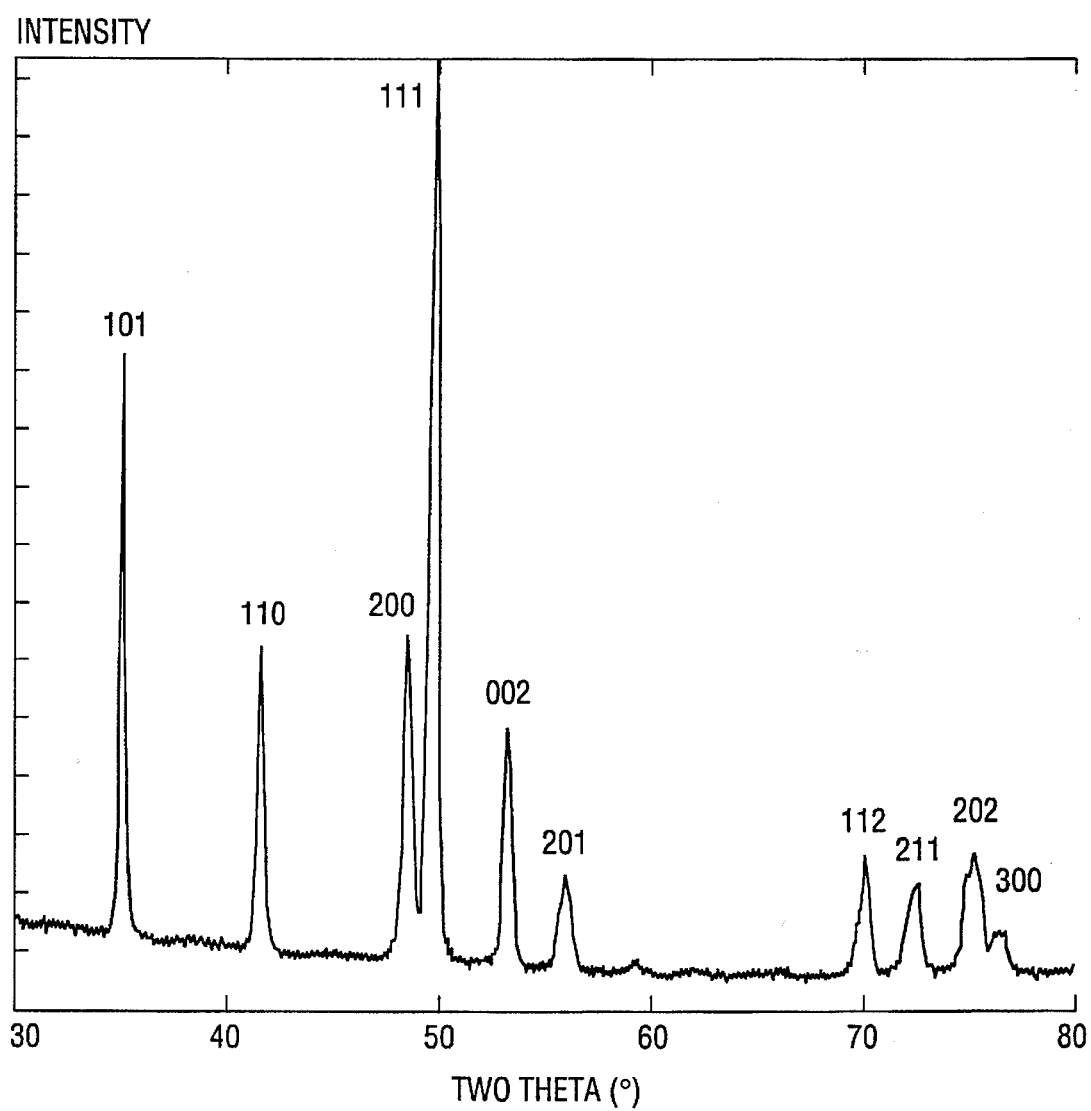
FIG. 3 shows an X-ray diffraction pattern of LaNi$_{4.8}$Sn$_{0.2}$.

X-ray diffractometry was used to characterize the material's microstructure and measure the lattice parameters of the binary and ternary alloys. FIG. 3 shows the powder diffraction pattern of $LaNi_{4.8}Sn_{0.2}$, verifying that it is single phase. There is an increase in the unit cell volume upon the substitution of Sn accompanying the decrease in the equilibrium pressure. From the X-ray diffraction data, the unit cell volume of $LaNi_{4.8}Sn_{0.2}$ is estimated to be 89,992 Å$^3$ as compared to 86,800 Å$^3$ for $LaNi_5$, i.e., a 3.7% increase in the unit cell volume.

The charge-discharge behavior of $LaNi_{4.8}Sn_{0.2}$ electrodes is superior to that of $LaNi_5$. $LaNi_{4.8}Sn_{0.2}$, electrodes showed a high initial capacity of 250 mAh/g in the flooded cell and ~275–300 mAh/g in the prismatic cell. Under these conditions, $LaNi_5$ could not be completely charged, since its equilibrium pressure is higher than 1 atm. Additionally, the average charging voltage for the Sn-modified $LaNi_5$ is lower than for the binary material. The charge voltage fluctuated in the case of $LaNi_5$ owing to a significant evolution of hydrogen on the electrode surface.

Figure 4A:
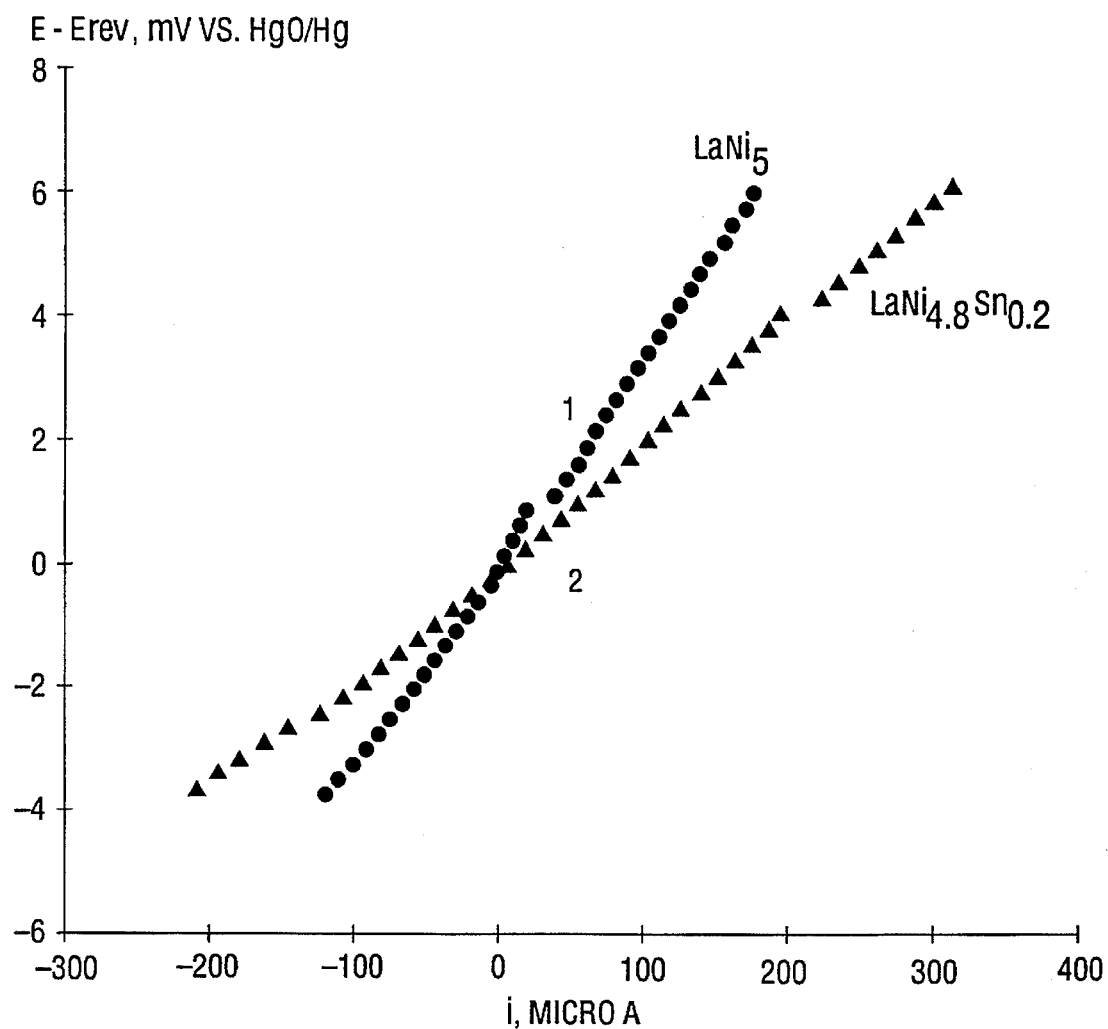
FIGS. 4A and 4B represent the linear (4A) and Tafel polarization (4B) plots of (1) LaNi$_5$ and (2) LaNi$_{4.8}$Sn$_{0.2}$ electrodes.
Figure 4B:
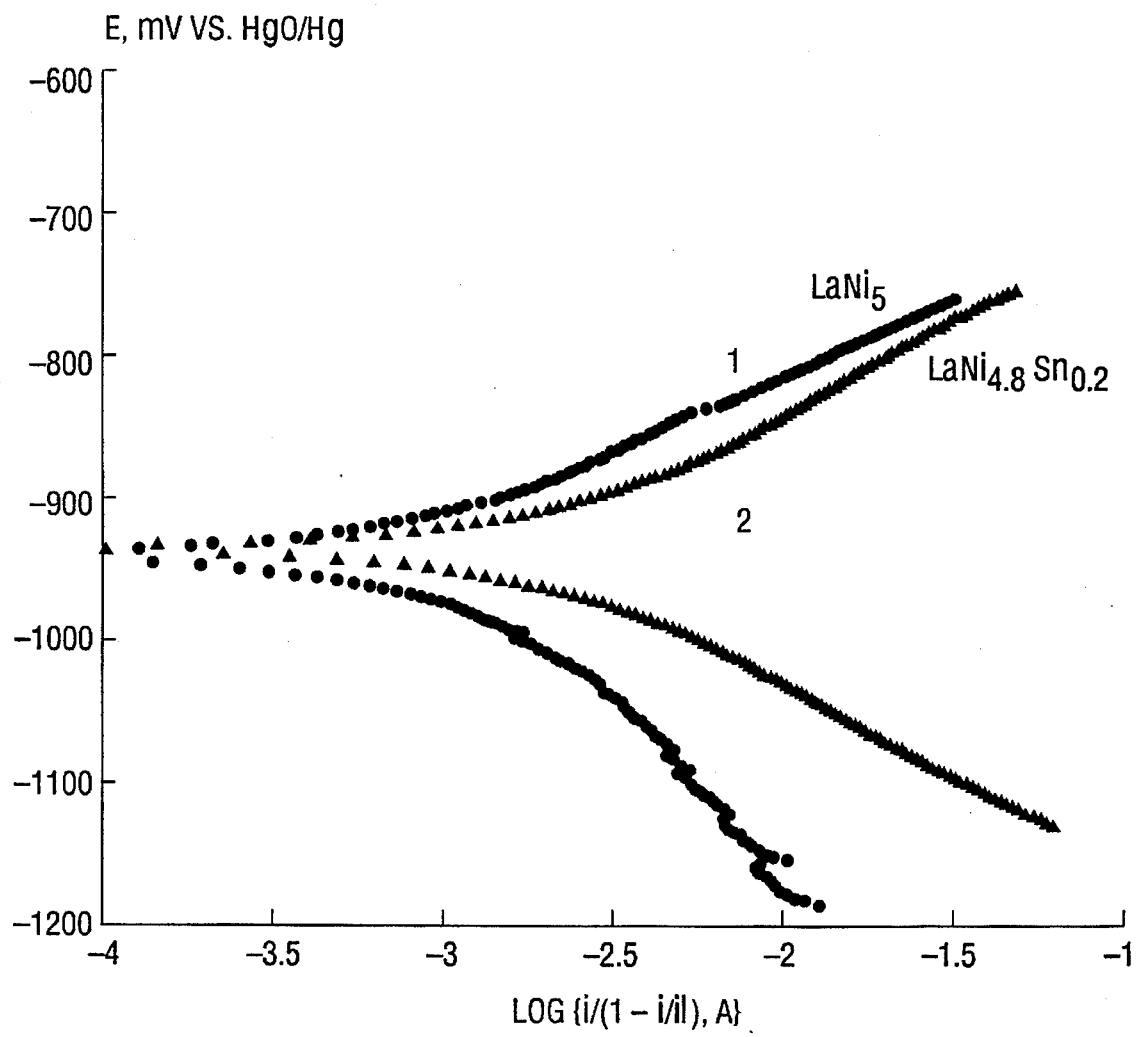

The electrochemical kinetics for the hydrogen absorption and desorption process were determined by DC polarization methods. The linear and Tafel polarization curves of these alloys are shown in FIGS. 4A and 4B, respectively, and the results are listed in Table II.

TABLE II

Electrochemical Kinetic Parameters of $LaNi_5$ and $LaNi_{4.8}Sn_{0.2}$ Anodes

| Linear Polarization | $LaNi_5$ | | $LaNi_{4.8}Sn_{0.2}$ | |
|---|---|---|---|---|
| Polarization resistance ($\Omega \cdot cm^2$) | 2.33 | | 1.35 | |
| Exchange current density ($10^{-4}\ A \cdot cm^{-2}$) | 1.1 | | 1.9 | |

| Tafel Polarization | Oxidation | Reduction | Oxidation | Reduction |
|---|---|---|---|---|
| Cathodic Tafel plot (mV) | 129 | 134 | 242 | 108 |
| Transfer coefficient | 0.25 | 0.54 | 0.46 | 0.44 |
| Exchange current density ($10^{-4}\ A \cdot cm^{-2}$) | 7.5 | 8.2 | 22.5 | 26 |

The linear polarization curves are fairly linear thereby enabling calculation of the polarization resistance from their slopes. The Tafel polarization curves reveal the interference of mass transfer at high overpotentials, for which corrections have been made to the Tafel plots. The cathodic Tafel plot of $LaNi_5$ appears to show a different slope at high overpotentials, possibly corresponding to hydrogen evolution. The exchange current densities obtained from the linear and Tafel polarizations reveal that the absorption and desorption processes are faster in the ternary alloy than in the binary. This is not surprising, as bimetallic Sn-noble metal catalysts are known to function as electrocatalysts, e.g. in the electrochemical oxidation of methanol from aqueous solutions. The presence of a tin oxide on the electrode surface would facilitate the dissociative absorption of a proton, which is a precursor for hydrogen absorption. In both plots, the observed area equals 0.07 $cm^2$. In (b), the data are corrected for mass transfer effects.

EXAMPLE 5

Hydrogen absorption/desorption cycling of the alloy hydrides was carried out in batteries having anodes manufactured according to the method of Example 4. Cycling of the cells was carried out using an automatic battery cycler at constant current (4 $mA.CM^2$, C/5 rate) to a cut off voltage of −0.5 V vs. the reference electrode (HgO/Hg) during discharge and to a charge return of 120%. DC polarization experiments were performed using an EG&G 273 Galvanostat/Potentiostat interfaced with an IBM-PC. Referring to FIG. 4, linear and Tafel polarization curves were obtained under potentiodynamic conditions at slow scan rates (0.02 mV/s and 0.5 mV/s, respectively) approximating steady state conditions.

Figure 5:
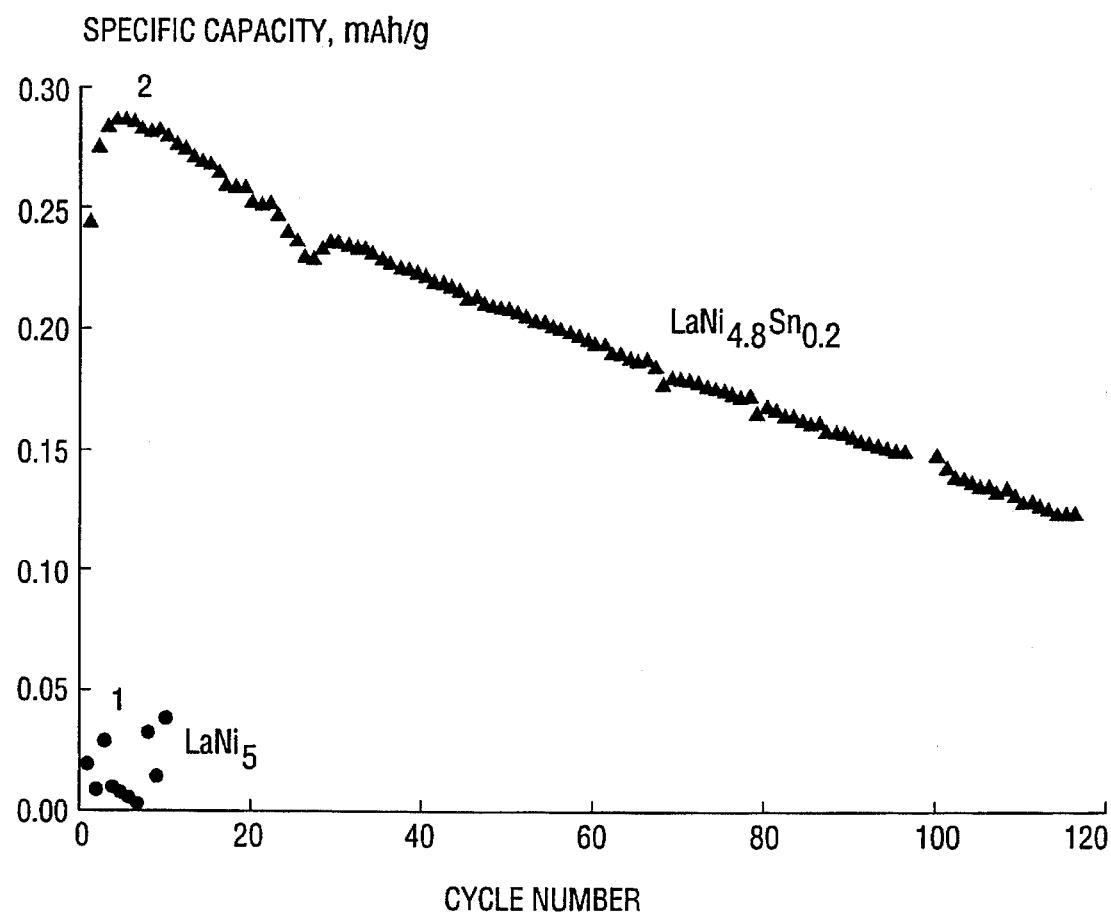
FIG. 5 illustrates the variation of capacity for 250 mAh, negative limited Ni-MH cells containing (1) LaNi$_5$ and (2) LaNi$_{4.8}$Sn$_{0.2}$ during cycling at a rate of one recharge to 120% of charge return every five hours.

The performance of the Sn-modified alloy during charge-discharge cycling in the negative-limited prismatic Ni-MH cells is shown in FIG. 5. The cells were charged @ 5 hour rate to 120% of charge return. The capacity of $LaNi_{5.0}$ is low (below 35 mAh/g) due to the incomplete charging. In comparison, the performance of the ternary alloy is rather impressive. Apart from a high initial capacity, $LaNi_{4.8}Sn_{0.2}$ also exhibits excellent capacity retention during the charge-discharge cycling. The capacity after 100 cycles is above 50% of its initial capacity. Indeed, the capacity retention during cycling of the Sn-substituted alloy is comparable to that of other experimental $AB_5$-based alloys. For example, the slope of the capacity versus cycle lifetime curve for $LaNi_{4.8}Sn_{0.2}$ electrodes is almost identical to the best of the (Mm) $(Ni-Co-Mn-Al)_5$ alloys with optimum ratios of La and Ce/Nd in the misch metal and Co, Mn and Al for the Ni sites.

EXAMPLE 6

A metallographic investigation was performed on a series of alloys having the composition $LaNi_{4.8}X_{0.2}$ where the ternary solute X was Si, Al, Ge, In, Sn, and Ni. The alloy ingots were manufactured according to the method of Example 1 and were crushed to 10 mesh in an argon glove box followed by one hydrogen absorption-desorption cycle to activate the powder and optimize the powder's surface area.

Figure 6A:
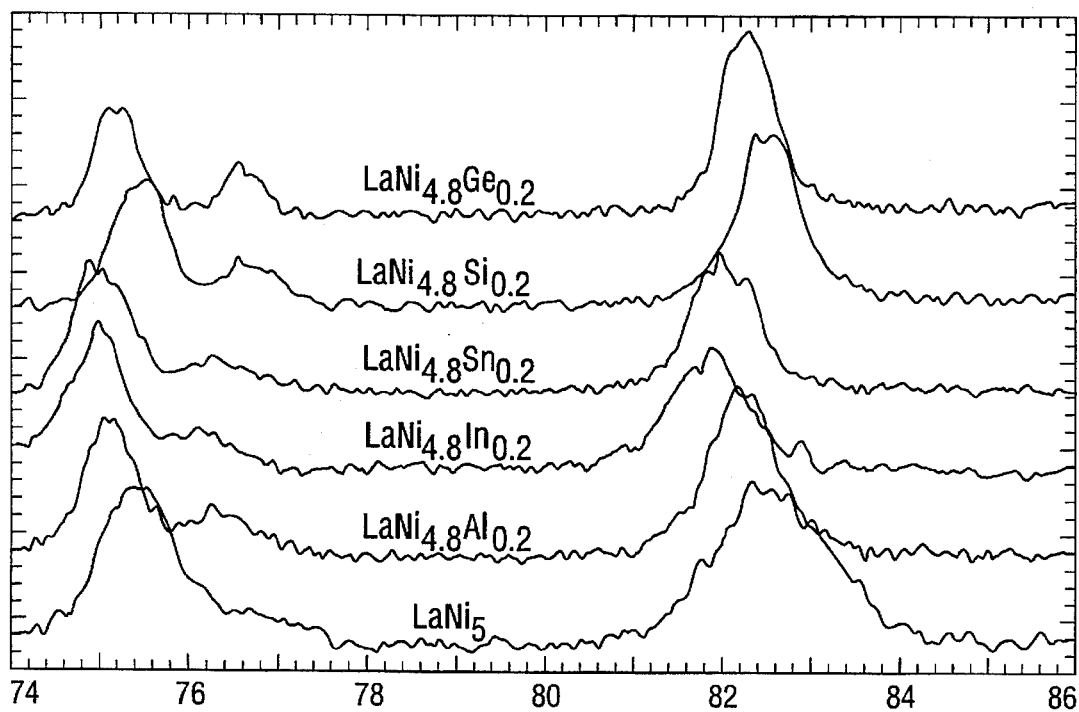
FIG. 6A illustrates X-ray diffraction patterns for LaNi$_{4.8}$X$_{0.2}$ alloys having Si, Al, Ge, In, Sn, and Ni as ternary solutes X.

Referring to FIG. 6A, X-ray diffraction patterns for the alloys were measured in the manner described in Example 2. The resulting diffraction patterns are arranged from top to bottom in the sequence of the relative heats of formation of the La-X alloys, i.e.; La-Ge, La-Si, La-Sn, La-In, La-Al and La-Ni. Although the diffraction patterns before hydrogen exposure were a set of sharp peaks, the microstructural damage induced by the hydrogen exposure caused a distinct broadening of the diffraction peaks. The X-ray diffraction patterns clearly show a correlation between the heat of formation of La-X and a corresponding decrease in microstructural damage after hydrogen absorption and desorption.

Figure 6B:
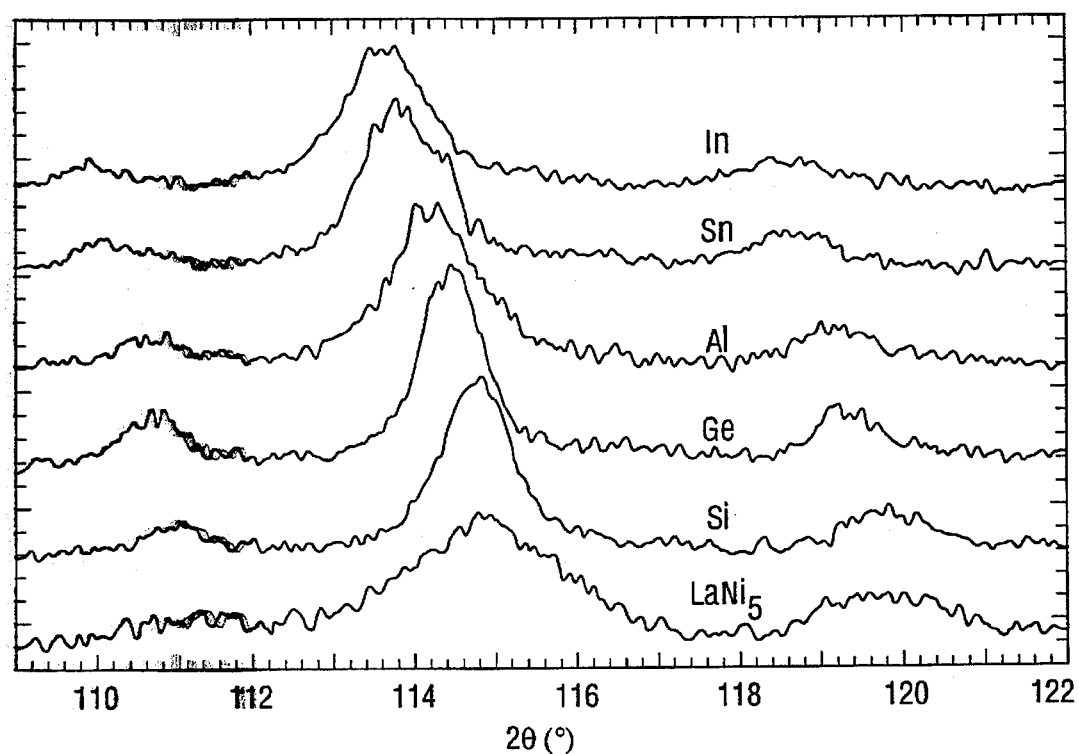
FIG. 6B illustrates a high angle region of the X-ray diffraction patterns for LaNi$_{4.8}$X$_{0.2}$ alloys of FIG. 6A.

Referring to FIG. 6B, a high-angle region of the diffraction pattern for the alloys of FIG. 6A are shown. The X-ray diffraction patterns for the high-angle region are arranged in the sequence of the metallic radius of the solute atoms X which are (in Angstroms); In 1.66, Sn 1.55, Al 1.43, Ge 1.37, Si 1.32, and Ni 1.25. The angle shift evidenced in the X-ray diffraction patterns shows an excellent correlation between the increase in crystallographic lattice parameters of the alloys, which shift the peaks to lower angles, and the metallic radii of the solute atoms X.

The results of the metallographic study of FIGS. 6A and 6B supports the proposition that solutes X with strong chemical bonds to the rare earth element, in this case lanthanum, suppress the damage to the crystal structure of the Haucke phase during hydrogen absorption/desorption cycling. The optimal solute concentration may not be simply the concentration which suppresses the microstructural damage, however, since the hydrogen absorption capacity at 1 atmosphere pressure is known to depend on the lattice parameter of the Haucke phase. For the solutes Si, Ge, In, Al, and Sn, it is possible to optimize the hydrogen absorption capacity and the cyclic lifetime by suitable combinations of these solutes.

In another aspect of the invention, the previously described alloys are used as electrocatalysts for the oxygen reduction reaction in electrochemical devices such as fuel cells and batteries. A fuel cell application is described below, however, it is understood that use of the alloys for electrocatalysis of the oxygen reduction reaction may be used in any other electrochemical device.

Fuel cells differ from batteries in that the reactants are not contained in the cell. A fuel, generally a gas, is provided which is consumed in the fuel cell at the anode to produce useful energy. An oxidant, generally oxygen, is provided at the cathode where the reduction of the oxidant occurs. The reactants (fuel and oxidant) are stored outside the reaction areas while the electrodes are ideally invariant in composition.

Figure 7:
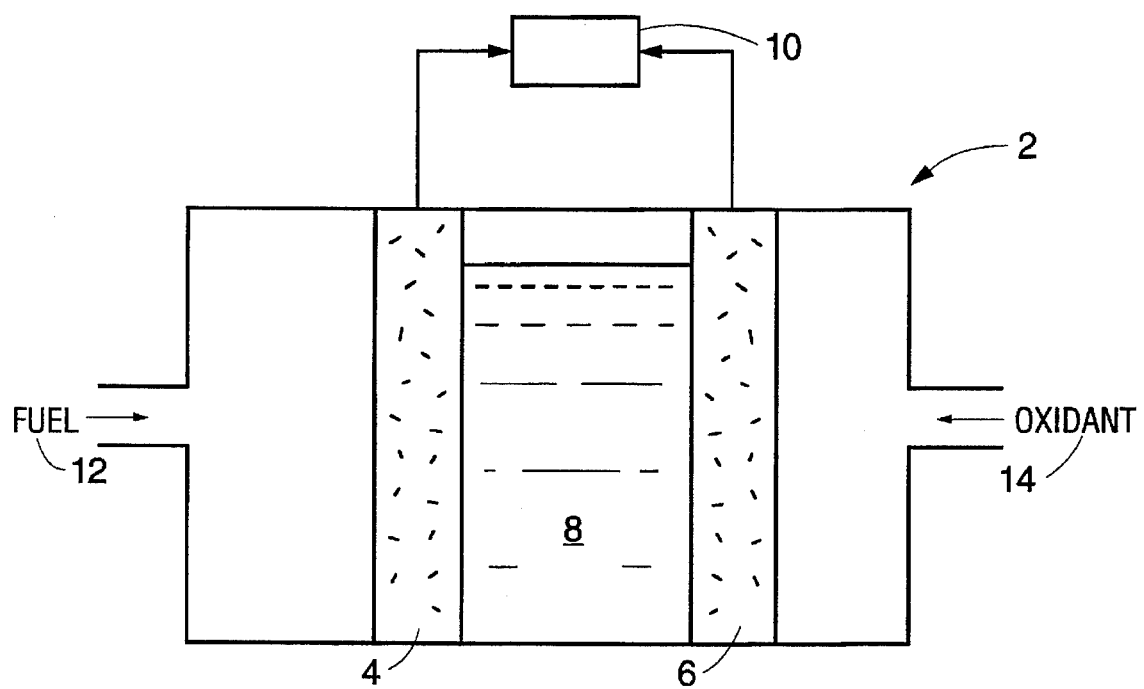
FIG. 7 shows the construction of a typical fuel cell.

Referring to FIG. 7, a typical fuel cell 2 is shown. The fuel cell 2 includes an anode 4 and a cathode 6 with an electrolyte 8 contained therebetween. An ionic separator can be used where needed. A load 10 is electrically coupled to the anode 4 and cathode 6 for performing useful work with the electrical energy provided by the fuel cell 2. A fuel contacts the anode 4 while an oxidant 14 contacts the cathode.

In a hydrogen-oxygen fuel cell the principal reactions are as follows:

Anode $H_2 \rightarrow 2H^+ + 2e^-$

Cathode $\frac{1}{2}O_2 + 2H^+ + 2e^- \rightarrow H_2O$ and the overall cell reaction is simply:

$H_2 + \frac{1}{2}O_2 \rightarrow H_2O$

The fuel cell 2 described above has an acidic electrolyte 8. The electric current is transported through the electrolyte 8 by the flow of hydrogen ions. If an alkaline electrolyte is used, the electric current is transported through the electrolyte by the flow of hydroxyl ions. In high temperature fuel cells, the ionic carriers in the electrolyte may be carbonate ions or oxide ions.

The present application may be practiced using any suitable electrolyte 8 and fuel 12. Examples of typical electrolytes 8 include aqueous alkaline, aqueous acid, molten carbonate and solid oxide electrolytes. The fuel 12 is preferably hydrogen gas but may also be a hydrocarbon, hydrazine, methanol, ammonia, formic acid or formaldehyde.

The principal reactions in the fuel cell 2 occur at the interface between the electrolyte 8, electrode 4, 6 and the fuel 12 or oxidant 14. For this reason, the electrodes 4, 6 are generally porous to maximize the gas/electrolyte interface when gaseous fuels 12 are used.

The choice of electrode materials for anodic electrocatalysis of hydrogen is readily effected by a fairly wide range of electrocatalysts in a variety of electrolytes. Hydrogen electrode current densities in excess of 200 mA/cm$^2$ can be achieved at anodic polarizations of less than 30 mV under mild operating conditions with typical catalysts. The oxygen reduction reaction, on the other hand, have polarizations of about 300–350 mV at the same current density. Noble metal catalysts are sometimes used for the electrocatalysis of hydrogen. Other suitable materials include nickel, nickel boride, sodium tungsten bronzes, tungsten trioxide and tungsten carbide. Although any suitable anode material may be used, the alloys described above are particularly useful as anode materials. The ability of the $AB_5$ alloys to absorb hydrogen is particularly useful since they can store up to one atom of hydrogen per metal atom.

Cyclic voltammetric studies were carried out on a cathode made of the previously described alloys in an alkaline electrolyte solution. Specifically, electrodes were fabricated from Mm(NiCoAl)$_5$ which is an $AB_5$-based alloy. Any of the other A or B ternary substitutes discussed above may also be used for the cathode material of the present invention. The use of misch metal (Mn) makes the alloy particularly attractive since it will be relatively inexpensive.

The test electrodes were subjected to an initial anodic scan (oxidation) to a potential of 0.4 V vs. Hg/HgO (or ~0.5 V vs. SHE) before the absorption of hydrogen. The interference due to the dehydriding reaction of the MH electrode was thus eliminated. The cyclic voltammetric peaks in this region would correspond to either the oxidation of the elements of the MH or the reactions involving electrolyte. Subsequently, the electrode was subject to a reverse (cathodic) scan to examine the reduction of the disclosed/evolved oxygen or any oxidized species from the MH alloy.

Figure 8:
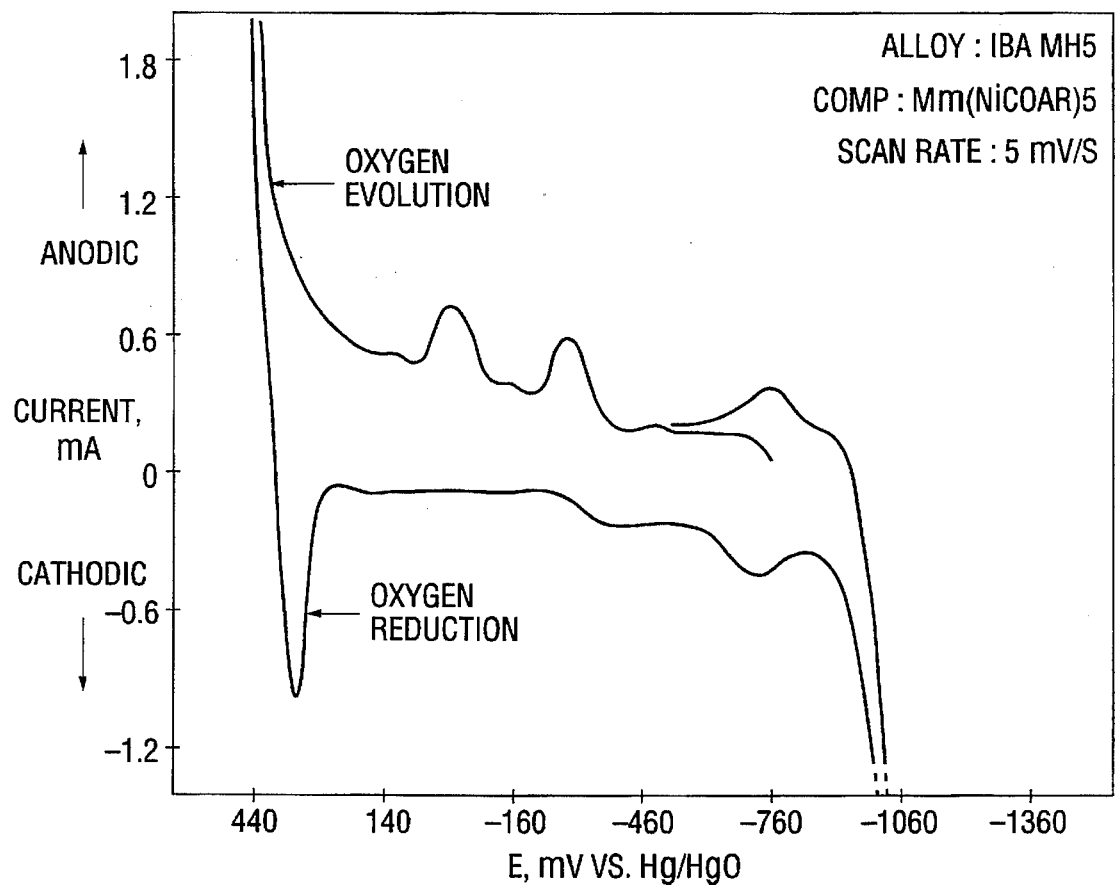
FIG. 8 is a voltammogram of a Mm(NiCoAl)$_5$ electrode in an alkaline solution.

Referring to FIG. 8, a voltammogram of the Mm(NiCoAl)$_5$ alloy is shown. The electrode (approximately 0.12 cm$^2$) was immersed in 6M KOH and exhibited two or three small peaks around 50 mV vs. Hg/HgO and a strong peak at 400 mV. The small peaks are attributed to the dissolved oxygen, since all the metallic constituents of the alloy are apparently oxidized even at the open circuit potential of −500 mV. Only elemental manganese can undergo oxidation to a high valence oxide in this range. The peak around 400 mV is related to the oxygen evolution at the ME electrode. In the subsequent reduction scan, a strong peak is observed at 350 mV, which may be assigned to the reduction of the oxygen either dissolved in the electrolyte or evolved in the preceding anodic scan.

Thus, it is clear that the reduction of oxygen as well as oxygen evolution occurs readily on the electrode which can be readily exploited in alkaline metal air cells or fuel cells. The ability to electrocatalyze the oxygen reduction reaction would enable the alloys to be used in a hermetically sealed configuration, especially in the positive limited design. The oxygen evolved at the positive electrode would be continuously reduced at the MH electrode thereby providing an overcharge capability for the cell.

A further advantage of the present invention is that the alloys of the present invention may be used as electrocatalysts for the oxygen reduction reaction as well as electrodes for the hydrogen ionization reaction. Thus, the alloys of the present invention may act as a bipolar electrode in regenerative fuel cells.

Figure 9:
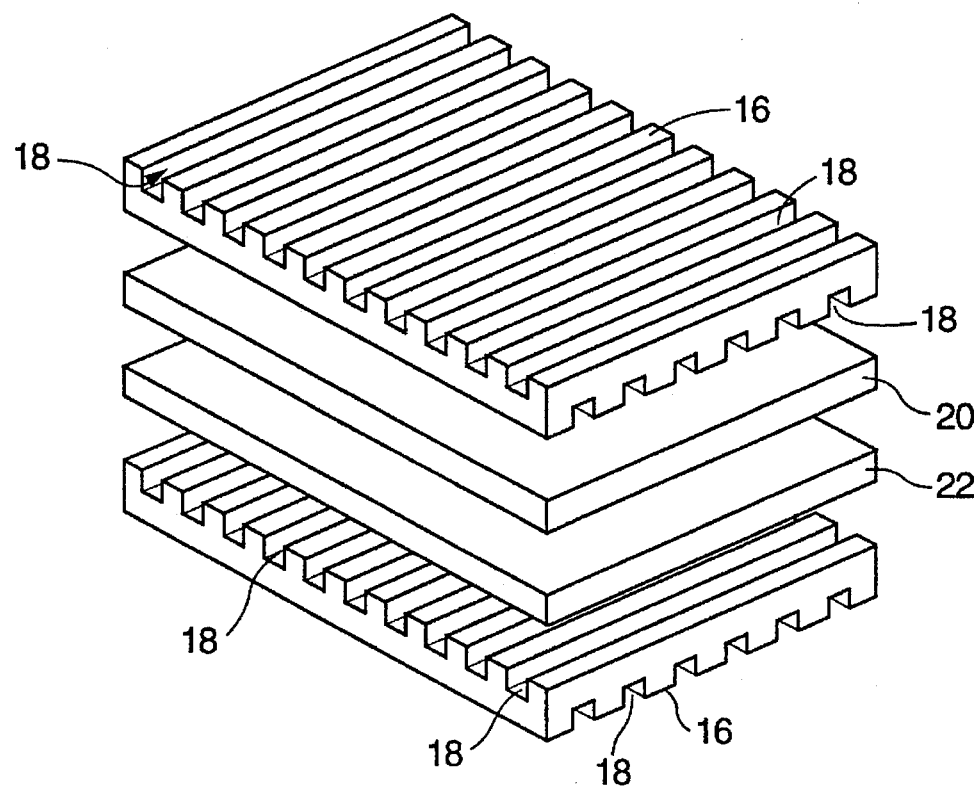
FIG. 9 is an exploded isometric view of a bipolar fuel cell.

Referring to FIG. 9, the basic components of bipolar fuel cell are shown. The bipolar fuel cell includes two porous separator plates 16 having channels 18 formed therein. The channels 18 provide flow paths for the oxidant, fuel and water. Sandwiched between the porous separator plates 16 are an anode substrate 20 and a cathode substrate 22. As described above, the alloys described herein are suitable for forming the anode and cathode substrates 20, 22.

Figure 10:
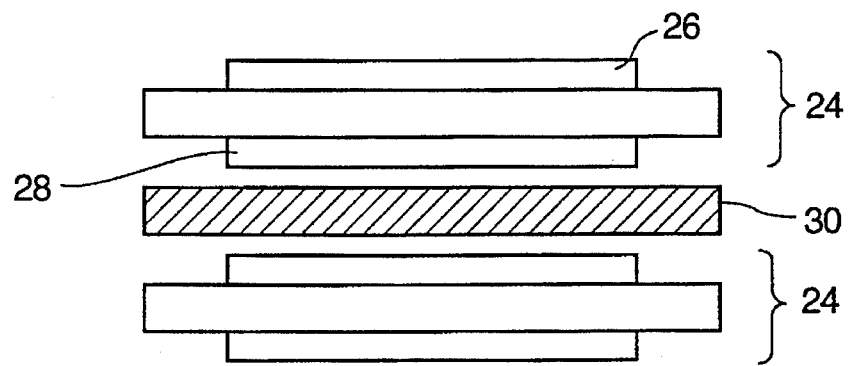
FIG. 10 is a sideview of a bipolar electrode for a battery.

The ability of the alloys described above to electrocatalyze the oxygen reduction reaction may also be utilized in batteries. A particularly useful application is in a bipolar metal hydride air cell or battery. Referring to FIG. 10, a battery structure incorporating bipolar electrodes is shown. The bipolar electrode 24 is preferably a plate having a positive side 26 and a negative side 28. In FIG. 10, a side view of a battery having two bipolar electrodes 24 is shown. A separator 30 separates the electrodes 24. A cover (not shown) surrounds the bipolar electrodes 24 and separators 30 and provides individual fluid chambers for containing an electrolyte. The battery is modular in that a number of bipolar electrodes 24 and separators 30 may be stacked one on top of the other thereby providing a flexible system.

The bipolar battery and bipolar fuel cell offer distinct advantages over conventional batteries and fuel cells having external electrical connections. Elimination of the electrical connections minimizes internal resistance and enhances specific energy and power density.

Although the invention has been described in some respects with reference to specified preferred embodiments thereof, many variations and modifications will be apparent to those skilled in the art. It is, therefore, the intention that the following claims not be given a restrictive interpretation but should be viewed to encompass such variations and modifications that may be derived from the inventive subject matter disclosed.

We claim:

1. A fuel cell, comprising:

an electrolyte;

an anode in contact with the electrolyte, the anode being made of a material selected to electrocatalyze a fuel;

a cathode contacting the electrolyte, the cathode being made of a material selected to electrocatalyze oxygen, the cathode material being an alloy having the formula:

$AB_{5-Y}X_Y$ as an atomic ratio;

wherein A includes at least one element selected from the group consisting of the rare earth metals;

B includes at least one element selected from the group consisting of iron, ruthenium, osmium, cobalt, rhodium, iridium, nickel, palladium, platinum, copper, silver, gold, zinc, manganese, cadmium, mercury, and aluminum;

X includes at least one element, E, selected so that at least one binary alloy selected from the group consisting of AE and BX BE has an enthalpy of formation greater than that of the enthalpy of formation of the binary alloy LaSn; and Y is greater than or equal to zero.

2. The fuel cell of claim 1, wherein:

A includes an element selected from the group consisting of cerium lanthanum, neodymium, praseodymium, and yttrium.

3. The fuel cell of claim 1, wherein:

A consists essentially of a misch metal; and

B includes nickel or cobalt or both.

4. The fuel cell of claim 1, wherein:

B includes at least one element selected from the group consisting of cobalt, iron, aluminum and nickel.

5. The fuel cell of claim 1, wherein:

the anode and the cathode form a bipolar electrode.

6. The fuel cell of claim 1, wherein:

A is lanthanum;

B is nickel; and

E includes at least one element selected from the group consisting of antimony, arsenic, germanium and bismuth.

7. The fuel cell of claim 1, wherein:

A is lanthanum;

B is nickel; and

E includes germanium.

8. A hydridable alloy having at least three elements, said hydridable alloy having the formula:

$AB_{(5-Y)}X_{(Y)}$ as an atomic ratio;

wherein A includes at least one element selected from the group consisting of the rare earth metals;

B includes at least one element selected from the group consisting of iron, ruthenium, osmium, cobalt, rhodium, iridium, nickel, palladium, platinum, copper, silver, gold, zinc, manganese, cadmium, mercury, and aluminum;

X includes at least one element, E, selected so that at least one binary alloy selected from the group consisting of AE and BE has an enthalpy of formation greater than that of the enthalpy of formation of the binary alloy LaSn; and Y is greater than zero and less than one.

9. The alloy of claim 8, wherein:

A includes at least one element selected from the group consisting of cerium, lanthanum, neodymium, praseodymium, and yttrium.

10. The alloy of claim 8, wherein:

A consists essentially of a misch metal.

11. The alloy of claim 8 wherein:

B includes at least one element selected from the group consisting of cobalt, iron, nickel, manganese and aluminum.

12. The alloy of claim 8, wherein:

A is lanthanum;

B is nickel; and

E includes at least one element selected from the group consisting of antimony, arsenic, germanium, and bismuth.

13. The alloy of claim 8, wherein:

A is lanthanum;

B is nickel; and

E includes germanium.

14. The alloy of claim 8, wherein:

the alloy has at least four elements.

15. The alloy of claim 14, wherein:

A includes at least one element selected from the group consisting of cerium, lanthanum, neodymium, praseodymium, and yttrium.

16. The alloy of claim 14 wherein:

A consists essentially of a misch metal.

17. The alloy of claim 14, wherein:

B includes at least one element selected from the group consisting of cobalt, iron, and nickel.

18. The alloy of claim 14, wherein:

A is lanthanum;

B is nickel; and

E includes at least one element selected from the group consisting of antimony, arsenic, germanium and bismuth.

19. The alloy of claim 14, wherein:

A is lanthanum;

B is nickel; and

E includes germanium.

20. A fuel cell, comprising:

an electrolyte;

an anode contacting the electrolyte, the anode being made of a material selected to electrocatalyze a fuel;

a cathode contacting the electrolyte, the cathode being made of a material selected to electrocatalyze oxygen, the cathode material being an alloy having the formula:

$AB_{(5-Y)}X_{(Y)}$ as an atomic ratio;

wherein A is a rare earth metal or mixture thereof or a mixture of a rare earth metal and at least one of the group consisting of Ti, Zr and Y;

B includes at least one element selected from the group consisting of iron, ruthenium, cobalt, rhodium, nickel, palladium, copper, silver, vanadium, chromium, manganese, niobium, and molybdenum;

X includes at least one element, E, selected so that at least one binary alloy selected from the group consisting of AE and BE has an enthalpy of formation greater than that of the enthalpy of formation of the binary alloy LaIn; and Y is greater than or equal to zero.

21. The fuel cell of claim 20 wherein:

A includes an element selected from the group consisting of cerium, lanthanum, neodymium, praseodymium, and yttrium.

22. The fuel cell of claim 20, wherein:

A consists essentially of a misch metal; and

B includes nickel or cobalt or both.

23. The fuel cell of claim 20, wherein:

B includes at least one element selected from the group consisting of cobalt, iron, manganese and nickel.

24. The fuel cell of claim 20, wherein:

the anode and the cathode form a bipolar electrode.

25. The fuel cell according to claim 20, wherein:

A is lanthanum;

B is nickel; and

X includes at least one element selected from the group consisting of antimony, arsenic, germanium and bismuth.

26. A hydridable alloy having at least three elements, said hydridable alloy having the formula $AB_{(5-Y)}X_{(Y)}$, as an atomic ratio, wherein A is a rare earth metal or mixture thereof or a mixture of a rare earth metal and at least one of the group consisting of Ti, Zr and Y;

B includes at least one element selected from the group consisting of iron, ruthenium, cobalt, rhodium, nickel, palladium, copper, silver, vanadium, chromium, manganese, niobium, and molybdenum;

X includes at least one element, E, selected so that at least one binary alloy selected from the group consisting of AE and BE has an enthalpy of formation greater than that of the enthalpy of formation of the binary alloy LaIn; and Y is greater than or equal to zero.

27. The alloy of claim 26, wherein:

A includes at least one element selected from the group consisting of cerium, lanthanum, neodymium, praseodymium, and yttrium.

28. The alloy of claim 26 wherein:

A consists essentially of a misch metal.

29. The alloy of claim 26 wherein:

B includes at least one element selected from the group consisting of cobalt, iron, and nickel.

* * * * *